US005905099A

United States Patent [19]
Everaerts et al.

[11] Patent Number: 5,905,099
[45] Date of Patent: *May 18, 1999

[54] HEAT-ACTIVATABLE ADHESIVE COMPOSITION

[75] Inventors: Albert I. Everaerts, Oakdale, Minn.; Yoshinori Araki, Tendo; Michiru Hata, Sagamihara, both of Japan

[73] Assignee: Minnesota Mining and Manufacturing Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/554,132

[22] Filed: Nov. 6, 1995

[51] Int. Cl.$^6$ ................... C08J 3/28; C08F 2/46
[52] U.S. Cl. ................... 522/126; 522/182; 522/171; 522/168; 522/180; 522/173; 522/175; 522/167; 522/113; 526/328; 526/328.5; 526/310; 526/312; 526/316; 526/317; 526/1; 526/318.3; 526/303.1
[58] Field of Search ................... 522/182, 126, 522/113, 171, 168, 180, 173, 175, 167; 526/303.1, 329.4, 328.5, 328, 310, 312, 316, 317.1, 318.3

[56] References Cited

U.S. PATENT DOCUMENTS

| | | | |
|---|---|---|---|
| 3,578,622 | 5/1971 | Brown et al. | 260/33.8 |
| 3,684,348 | 8/1972 | Rowland | 350/103 |
| 4,025,159 | 5/1977 | McGrath | 350/105 |
| 4,248,748 | 2/1981 | McGrath et al. | 260/27 R |
| 4,329,384 | 5/1982 | Vesley et al. | 428/40 |
| 4,330,590 | 5/1982 | Vesley | 428/336 |
| 4,379,201 | 4/1983 | Heilmann et al. | 428/345 |
| 4,588,258 | 5/1986 | Hoopman | 350/103 |
| 4,737,559 | 4/1988 | Kellen et al. | 526/291 |
| 4,775,219 | 10/1988 | Appledorn et al. | 350/103 |
| 4,805,984 | 2/1989 | Cobb, Jr. | 350/96.28 |
| 4,906,070 | 3/1990 | Cobb, Jr. | 350/286 |
| 4,946,742 | 8/1990 | Landin | 428/354 |
| 4,988,742 | 1/1991 | Moon et al. | 522/79 |
| 5,056,892 | 10/1991 | Cobb, Jr. | 359/831 |
| 5,102,924 | 4/1992 | Williams et al. | 522/4 |
| 5,138,488 | 8/1992 | Szczech | 359/529 |
| 5,175,030 | 12/1992 | Lu et al. | 428/30 |
| 5,183,597 | 2/1993 | Lu | 264/1.4 |
| 5,308,887 | 5/1994 | Ko et al. | 522/148 |
| 5,334,686 | 8/1994 | Ando et al. | 526/307.7 |
| 5,407,971 | 4/1995 | Everaerts et al. | 522/35 |
| 5,602,221 | 2/1997 | Bennett et al. | 526/307.7 |
| 5,616,670 | 4/1997 | Bennett et al. | 526/307.7 |
| 5,620,795 | 4/1997 | Haak et al. | 428/344 |
| 5,623,000 | 4/1997 | Yoshikawa et al. | 522/16 |
| 5,654,387 | 8/1997 | Bennett et al. | 526/307.7 |

FOREIGN PATENT DOCUMENTS

| | | | |
|---|---|---|---|
| 0 615 983 A2 | 9/1994 | European Pat. Off. | C08F 220/18 |
| 2-200476 | 8/1990 | Japan . | |
| 5-310810 | 11/1993 | Japan . | |
| 6-128544 | 5/1994 | Japan | C09J 133/08 |
| WO 95/10552 | 4/1995 | WIPO | C08F 20/38 |
| WO 95/13328 | 5/1995 | WIPO | C09J 4/06 |
| WO 95/13331 | 5/1995 | WIPO | C09J 133/00 |

OTHER PUBLICATIONS

Cramm, R.H. et al., "The theory and practice of corona treatment for improving adhesion," *TAPPI*, vol. 65, No. 8, Aug. 1982, pp. 75–78.

Wake, William C., *Adhesion and the Formulation of Adhesives*, 2d Ed., 1976, pp. 98–99.

Fox, T.G., *Bull. Am. Phys. Soc.*, Ser. 2, 1:123, 1956.

*Primary Examiner*—Nam Nguyen
*Assistant Examiner*—Steven H. Ver Steeg
*Attorney, Agent, or Firm*—Lisa M. Fagan; Daniel M. Pauly

[57] ABSTRACT

A heat-activatable adhesive comprising an acrylic copolymer, which copolymer comprises a monomer consisting of an acrylate or methacrylate ester of a non-tertiary alkyl alcohol having a Tg of about 0° C. or lower; a monomer consisting of an acrylate or methacrylate ester of an alcohol having a Tg of at least about 5° C.; and a functional monomer. Selected embodiments include a retroreflective article comprising a film having a substantially flat surface and a structured surface, the structured surface comprising a plurality of precisely shaped projections, a colored layer disposed on the structured surface and adhered thereto in a plurality of discrete locations, and a heat-activatable adhesive layer disposed on the colored layer.

15 Claims, 2 Drawing Sheets

HEAT-ACTIVATABLE ADHESIVE COMPOSITION

BACKGROUND OF THE INVENTION

1. Field of the Invention

The invention relates to a crosslinked acrylic heat-activatable adhesive with low activation temperature, and products containing said adhesive.

2. Related Art

Most embedded-lens and encapsulated-lens retroreflective sheetings, in particular for the Japanese traffic sign market, are heat applicable sheetings having a heat activatable adhesive. However, cube corner retroreflective sheetings are typically only adhered through the use of pressure-sensitive adhesives, which are substantially different from heat activatable adhesives. See, e.g., *Adhesion and the Formulation of Adhesives 2d Ed.*, Wake, pp. 98–99 (Elsevier Applied Science Publishers 1986). Heat applicable cube corner retroreflective sheetings would be advantageous since they would have better handling characteristics, better quality, and easy maintenance.

A heat applicable cube corner retroreflective sheeting should have the desired optical clarity; have the desired level of tack, so that the sheeting is preferably positionable, but does not slide on the substrate once its position is fixed; have the ability to be applied at around 70° C. or less by a heat lamp vacuum applicator ("HLVA") without loss of optical quality; adhere very strongly without any delamination or "pop off" failure; and be applicable to curved edge substrates such as the aluminum panels used for Japanese regulatory road signs.

Adhesives comprising nitrile rubber and an acrylic polymer, disclosed in Japanese Published Patent Kokai No. 88056274-B, are heat-activatable adhesives currently employed to adhere retroreflective sheetings to aluminum substrates in the Japanese traffic sign market. However, if this type of adhesive is applied to a cube corner retroreflective sheeting, the whiteness of the sheeting typically decreases because the color of the adhesive is dark brown and the sheeting is translucent. Further, when the heat-activatable adhesives of the prior art are laminated to a cube corner retroreflective sheeting wherein the sealing film of the sheeting has a surface treatment such as corona or chemical primer, the sheeting cannot hold on curved edge substrates because of their low cohesiveness at elevated temperatures. Because the heat activation temperature of the current heat-activatable adhesives is relatively high (about 82° to 93° C.), the brightness of the sheeting typically decreases due to thermal distortion of its retroreflective elements. Also, the nitrile rubber-based heat-activatable adhesives have little or no tack at room temperature. As a result, they are not appropriate for adhering cube corner retroreflective sheetings to aluminum because the sheeting shifts before HLVA processing.

A pressure applicable cube-corner retroreflective sheeting is not easily positionable because most pressure-sensitive adhesives have very high initial tack. Because the adhesive typically fails cohesively after application, the sheeting can only be applied to curved substrates that have a 127 millimeter ("mm") or greater radius. Such adhesives cannot hold on the curved edges of regulatory guidesigns in the Japanese traffic sign market which typically have a 7 to 8 mm radius. Further, sheetings applied using pressure-sensitive adhesives tend to trap air between the substrate and the sheeting during sign fabrication, so waste is typically high.

Similar requirements need to be met for the application of optically clear overlay films to traffic signs, Dinoc products and the lamination of light management films to glass or clear plastic surfaces. Overlay films typically must be laminated to their substrates without entrapment of air bubbles and without interfering with the optics of the product. Such films typically provide such unique properties as stain resistance, dew resistance and the like. Light management products, such as brightness enhancement films, light control films and privacy films for computer or monitor screens may be considered as special examples of overlay films wherein the primary function is control of the optical properties of the product.

Decorative films, such as for tile, tables and countertops, also make use of overlay films. In such decorative films, ease of application, including positionability and the ability to be bonded to the substrate without entrapment of air bubbles are of considerable importance.

Pressure-sensitive adhesives and tapes currently produced by ultraviolet ("UV") polymerization do not meet all the above requirements, especially with respect to tack, because the higher tack of known pressure-sensitive adhesives makes them very difficult to position. Known heat-activatable adhesives often lack the combination of optical clarity, high cohesive strength and low temperature of activation which is critical for lamination of microstructured surfaces such as those used in the retroreflective sheeting products of this invention.

Acrylic adhesives employing isobornyl acrylate are described in Japanese Published Patent Kokai Nos. 5(1993)-310810 and 6(1994)-128544, but these references do not teach or suggest their use in adhering retroreflective sheetings to substrates.

Acrylic adhesives employing N,N-dialkyl substituted amides are described in U.S. Pat. No. 4,946,742, U.S. Pat. No. 5,334,686 and EP 615 983 A2. While some of these disclose pressure-sensitive adhesives for PVC application, none disclose heat-activatable and optically clear adhesives used for the application of sheeting products.

A need exists for improved heat-activatable adhesives for adherence of the sheeting to desired substrates. A need also exists for heat-applicable sheeting products that may be used, for example, to enhance brightness, control light, help maintain the privacy of a computer screen, enhance the appearance of substrates, or create reflective areas on clothing or other articles to enhance the visibility of the user.

SUMMARY OF THE INVENTION

The present invention provides a heat-activatable adhesive composition comprising an acrylic copolymer, said copolymer comprising: (a) about 10 to 85 wt-% based on monomer weight of a monomer consisting of an acrylate or methacrylate ester of a non-tertiary alkyl alcohol having a $T_g$ of about 0° C. or lower; (b) about 10 to 70 wt-% based on monomer weight of a monomer consisting of an acrylate or methacrylate ester of a non-tertiary alkyl alcohol having a $T_g$ of at least about 50° C.; and (c) about 5 to 50 wt-% based on monomer weight of a functional monomer.

The present invention also provides retroreflective articles having on the rear, i.e., non-light-impinging, surface thereof a low temperature heat-activatable adhesive. The invention further provides light controlling and optically clear overlay films having a low temperature heat-activatable adhesive on at least one surface. The adhesive of the invention has high transparency both upon application and after aging, excellent cohesive strength, high adhesion to polar substrates such as aluminum, glass, PVC, PMMA and stainless steel, and is obtained from a solventless process.

Retroreflective articles of the invention comprise, in order, a retroreflective sheeting having a substantially flat surface and a structured surface, the structured surface comprised of a plurality of precisely shaped projections such as cube corner elements, a colored thermoplastic layer disposed on the structured surface and adhered thereto in a plurality of discrete locations, and a heat-activatable adhesive layer disposed on the colored thermoplastic layer. The heat activatable adhesive layer may comprise a crosslinked acrylic polymer having an elastic modulus (measured by dynamic mechanical thermal analyzer, 6.28 rad/second, compression mode) ranging from about $5\times10^6$ to about $1\times10^8$ dyne/square centimeter ($dyn/cm^2$) at 30° C., and preferably ranging from about $5.0\times10^5$ to about $1.0\times10^7$ $dyn/cm^2$ at 70° C.

The invention further provides articles having decorative and optical properties containing the heat-activatable adhesive of the invention.

The overlay film of the present invention is used to provide a barrier to prevent foreign materials such as organic solvents, water, dirt, oil, dust, etc., from attacking the retroreflective, e.g., cube corner film. The film can also be used to protect various surfaces and substrates from vandalism such as graffiti. Thus, the polymeric materials used in the overlay film should be generally resistant to degradation by weathering (e.g., heat, UV light) and chemical attack so that the retroreflective sheeting can be used for generally long-term outdoor applications. The polymeric materials should also have good adhesion to the cube-corner layer and ink.

Adhesives of this invention meet the requirements of the Japanese traffic sign market, that is, they have high transparency both initially and upon aging; appropriate initial room temperature tack to position the sheeting, high adhesion to aluminum, stainless steel and other sheeting substrates; low activation temperature (not more than about 70° C.); they do not decrease the retroreflective brightness of the retroreflective sheeting, and they exhibit excellent cohesive strength to hold the sheeting on curved substrates. Combinations of all these properties are difficult but not impossible to obtain from solvent-based heat-activatable adhesives. However, adhesives of the invention are advantageous from the standpoint of environmental problems because they can be made by a solventless process.

The heat applicable cube-corner retroreflective sheetings, light control, overlay, and other films of the invention can be readily applied without permanently trapping air. Retroreflective articles provide excellent adhesion to round edge substrates such as are used for Japanese regulated road signs, as well as to various severely curved substrates useful in the construction work zone market.

BRIEF DESCRIPTION OF THE DRAWINGS

The invention will be further explained with references to the drawings, wherein.

These figures, which are idealized, are not to scale and are intended to be merely illustrative and non-limiting.

DETAILED DESCRIPTION OF THE INVENTION

Figure 1:
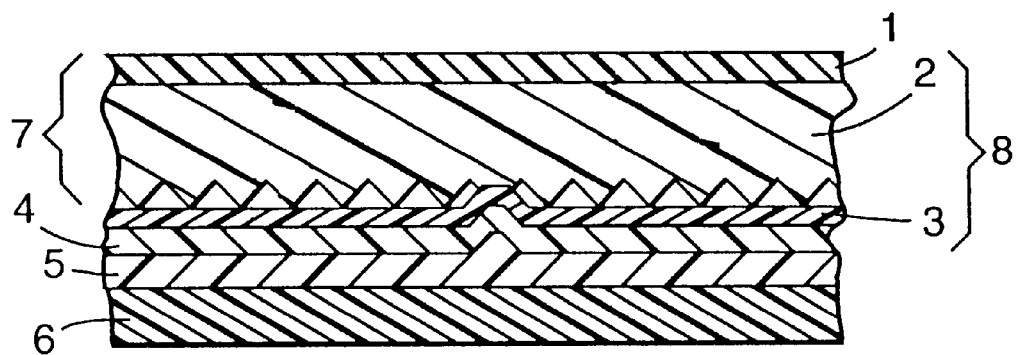
FIG. 1 is a cross-sectional view of a retroreflective sheeting article made in accordance with the present invention.

An illustrative retroreflective article of the present invention is shown (in enlarged cross-section) in FIG. 1. Overlay film 1 is preferably disposed on a flat, smooth surface of layer 2, the combination of overlay 1 and layer 2 referred to as a structured sheeting 7. Colored sealing film 3 is disposed on the rear or structured surface of layer 2, and empty volumes 10 are defined between the recesses of layer 2 and colored sealing film 3 so as to impart retroreflectivity to the article. Sealing film 3 is preferably sealed to layer 2 in a network of interconnection bonds such as is disclosed in U.S. Pat. No. 4,025,159 (McGrath).

In FIG. 1, reference numeral 4 denotes an optional chemical primer layer or a corona treatment layer disposed on the surface of colored sealing film 3. Chemical and/or physical priming is preferred but not necessary to the invention. The combination of layers consisting of structured sheeting 7, colored sealing film 3, and primer and/or treatment layer 4 is designated as "retroreflective sheeting" 8. Illustrative examples of primer layers include layers of materials that provide a strong bond between sealing film 3 and adhesive layer 5. In another illustrative embodiment, sealing film 3 and/or adhesive layer 5 may be surface treated, for example by corona treatment, prior to being bonded together.

Layer 5 of a heat-activatable adhesive is disposed on the surface of the primer layer or corona treatment layer 4 or directly on sealing film 3 if no primer treatment is used. Liner 6 is preferably disposed on the surface of heat-activatable adhesive layer 5 so as to protect its surface. A sheet having members 1 to 6 described above is referred to herein as "heat-activatable retroreflective sheeting".

The inventive adhesive of the articles of the invention, and the articles themselves are now described in more detail.

I. Acrylic Heat-activatable Adhesive

Heat-activatable adhesives of the present invention exhibit transparency of at least 85 percent in terms of the value measured by the method described in the Examples section infra. If the adhesive transparency is less than 85 percent, the color of the adhesive is visible through the seal film and the structured surface portions of the article, and the appearance and visibility of the article is degraded. A preferred range of transparency is at least 88 percent and more preferably at least 90 percent, to improve performance of the reflective sheeting.

The glass transition temperature ($T_g$) of polymers is calculated using the glass transition temperature of the homopolymers of each monomer and the weight fraction of the monomers, as shown in the following equation of Fox, T. G., *Bull. Am. Phys. Soc.* (Ser 2) 1:123 (1956), $$1/T_g = W_a/T_g a + W_b/T_g b + W_c/T_g c$$

wherein $T_g$, $T_g a$, $T_g b$ and $T_g c$ designate the glass transition temperature (in °K) of a terpolymer of monomers a, b, and c, a homopolymer of monomer a, a homopolymer of monomer b, and a homopolymer of monomer c, respectively. $W_a$, $W_b$, and $W_c$ are the weight fractions of monomers a, b, and c, respectively, where $W_a + W_b + W_c = 1$. For the purposes of this invention, the $T_g$ of the heat-activatable adhesive is substantially equal to the $T_g$ of the acrylic copolymer or terpolymer.

To obtain the appropriate tack, the glass transition temperature of the heat-activatable adhesive must be increased to a value higher than that of normally used pressure-sensitive adhesives. This may be accomplished by the use of monomers which have higher homopolymer glass transition temperatures; or by changing the weight fractions of the component monomers.

The glass transition temperature of adhesives useful in the present invention is about 0° to 40° C. When the glass transition temperature is lower than about 0° C., preadhesion tack tends to become excessively high, making positioning and repositioning difficult. When it exceeds about 40° C., preadhesion tack tends to become excessively low, making it difficult to keep the articles securely positioned during heat-activation and bonding. Further, the heat press temperature needed to achieve a good bond tends to become high. The glass transition temperature of the adhesive is preferably about 10 to 35° C. and more preferably about 15 to 30° C. When the glass transition temperature is within such ranges, final bonding at a lower heat press temperature becomes easier and at the same time, tack within a suitable range can be obtained.

The tack value of the adhesive of the present invention is preferably about 50 to about 1,000 gramsforce/inch ("$g_f$/inch") in terms of the value of the "preadhesion test" which is also described in the Examples section, and more preferably is about 500 to about 950 $g_f$/inch.

The adhesives of the invention are comprised of three types of monomers: a low $T_g$ acrylate monomer, a functional monomer, and a high $T_g$ acrylate monomer. The weight average molecular weight of the acrylic polymers is preferably within the range of 10,000 to 5,000,000 and particularly preferably within the range of 500,000 to 2,000,000.

Acrylic copolymers useful in the adhesive of the invention comprise from about 10 to about 85 wt-% based on monomer weight, preferably about 20 to about 70 wt-% of at least one low $T_g$ acrylate or methacrylate monomer. Higher amounts of this monomer relative to the other comonomers will soften the heat-activatable adhesive, while less than about 10 wt-% of this monomer will significantly reduce or eliminate the tack. Useful low $T_g$ monomers include those selected from the group consisting of a monofunctional acrylate or methacrylate ester of a non-tertiary alkyl alcohol, the alkyl group of which comprises from 4 to about 12 carbon atoms, and mixtures thereof. Such low $T_g$ acrylate or methacrylate esters generally have, as homopolymers, glass transition temperatures below about 0° C.

Preferred low $T_g$ acrylate or methacrylate ester monomers include ethyl acrylate, n-butyl acrylate (BA), isobutyl acrylate, 2-methyl butyl acrylate, 2-ethylhexyl acrylate, 2-ethylhexyl methacrylate, n-octyl acrylate, n-octyl methacrylate, isooctyl acrylate (IOA), isooctyl methacrylate, isononyl acrylate, isodecyl acrylate, and mixtures thereof.

Particularly preferred low $T_g$ acrylate monomers include isooctyl acrylate, n-butyl acrylate, 2-methyl butyl acrylate, 2-ethylhexyl acrylate, and mixtures thereof.

The copolymers of the invention also contain at least one functional monomer useful to enhance specific adhesion to certain surfaces and increase total adhesion. For instance, acid functional monomers such as acrylic acid will enhance adhesion to polar surfaces such as glass or metals, paint, and to basic surfaces. Weakly basic monomers, like N,N-dimethyl acrylamide and N-vinylpyrrolidone, will enhance adhesion to surfaces such as plasticized and rigid PVC and to acidic surfaces.

Useful functional monomers include those containing polar functional groups, like carboxylic, sulfonic and phosphoric acids; hydroxy groups, lactam and lactone groups; N-substituted amides, N-substituted amine, carbamates and the like. In general, the functional monomer may comprise about 5 to 50 wt-% based on total monomer weight of the copolymer.

Moderately basic, functional monomers include N,N-dialkyl substituted amides and monomers which behave as N,N-dialkyl substituted amides. Examples include N,N-dimethyl acrylamide (NNDMA), N,N-dimethyl methacrylamide, N,N-diethyl acrylamide, N,N-diethyl methacrylamide, N-vinyl pyrrolidone (NVP), N-vinyl caprolactam and the like.

Weakly basic copolymerizable monomers, such as N-octyl acrylamide can be used in combination with a major amount of moderately basic monomer. Strongly basic monomers (monomers having non-sterically hindered tertiary amine terminal groups) such as N,N-dimethylaminoethyl methacrylate, N,N-dimethylaminopropyl methacrylate, N,N-dimethylaminoethyl acrylate, N,N-dimethylaminopropyl acrylate, and the like, were found to be too basic when used as the sole basic monomer, dehydrochlorinating PVC upon aging and thereby possibly shortening the useful life of PVC coated fabric and other PVC components. If strongly basic monomers are employed, it is preferred that these monomers be present in a minor amount and that they are used in conjunction with a major amount of a moderately basic monomer. If a strongly basic monomer is used, it is present up to about 5 wt-% based on total monomer weight. More preferred are moderately basic polar monomers, alone or in combination with other basic monomers. About 5 to 45 wt-% of moderately basic monomers can be used, and about 15 to 30 wt-% of basic monomer is especially preferred.

Preferred acid functional monomers include acrylic acid, β-carboxyethyl acrylate, methacrylic acid, itaconic acid, crotonic acid, fumaric acid and the like. Preferred are moderately basic monomers such as N,N-dimethyl acrylamide, N,N-dimethyl methacrylamide, N,N-diethyl acrylamide, N,N-diethyl methacrylamide, N-vinyl caprolactam, N-vinyl pyrrolidone, and the like. If an acidic functional monomer is used it preferably comprises about 5 to 20 wt-% of the copolymer.

Functional monomer(s) are typically copolymerized with the rest of the copolymer components at levels from about 5 to 50 parts per hundred by weight of the monomer composition, more preferably from 10 to 40 parts per hundred by weight of the monomer composition. These functional monomers can also be used as crosslinking sites for the polymer. For example, acidic monomers can be reacted with crosslinking agents that react with the acid group, for example multifunctional epoxies or isocyanates.

The acrylic copolymers useful in the heat-activatable adhesive of this invention contain from about 10 to 70 parts per hundred by weight of monomer (wt-%), preferably from about 20 to 60 wt-%, contained in the copolymer of at least one monomer which as a homopolymer has a high $T_g$. As used herein, "high $T_g$" means the corresponding homopolymer has a $T_g$ of at least 50° C., preferably of at least 75° C., and more preferably at least 100° C.

Typically, the higher the amount of the high $T_g$ monomer in the acrylate copolymers of the heat-activatable adhesive of this invention, the lower the tack and preadhesion of the adhesive and the higher the heat-activation temperature. The lower the amount of these high $T_g$ monomers, the higher the preadhesion and the lower the activation temperature. The amounts of this high $T_g$ monomer and the low $T_g$ monomer are balanced to provide the desired properties.

So long as the monomer can be polymerized with the rest of the monomers that comprise the acrylic copolymer, any high $T_g$ monomer, including styrene and the like, can be used. However, the high $T_g$ monomer is typically an acrylate or methacrylate ester. Preferred high $T_g$ monomers are monofunctional acrylate or methacrylate esters of bridged cycloalkyl alcohols having at least 6 carbon atoms and of aromatic alcohols. Both the cycloalkyl and aromatic groups may be substituted, for example, by $C_{1-6}$ alkyl, halogen, cyano, and the like. Especially preferred high $T_g$ monomers include 3,5-dimethyladamantyl acrylate and methacrylate; isobornyl acrylate and methacrylate; 4-biphenylyl acrylate and methacrylate; phenyl acrylate and methacrylate; and 2-naphthyl acrylate and methacrylate. Mixtures of high $T_g$ monomers may also be used.

Preferably, the acrylic polymers useful as the adhesives of the invention are crosslinked. This improves cohesive strength of the adhesive, making it easier to control the elastic modulus, heat activation temperature, and preadhesion tack.

A crosslinking agent may preferably be present in the heat-activatable adhesive in an amount of about 0.05 to about 3 wt-%, more preferably about 0.1 to 2 wt-%, based on the weight of the monomers in the adhesive. Depending on the molecular weight and the acrylate equivalent weight of the components, as much as about 20 wt-% of a crosslinking agent may be used.

The crosslinking agent useful in the adhesives of the invention is typically an organic compound that reacts with the other monomers by virtue of having a plurality of ethylenically unsaturated groups, referred to herein as multifunctional acrylates. Alternatively, a crosslinking agent is a compound which can directly react with the polymeric backbone and result in crosslinking as, for example, in a peroxide thermal cure or benzophenone UV cure.

The adhesives of the present invention may be crosslinked before or after bonding of the sheeting to a substrate. There are two major crosslinking mechanisms for the acrylic polymer adhesives of the invention: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. High energy irradiation, like electron-beam or gamma is also useful. With the exception of the use of multifunctional vinyl unsaturated monomers, all the crosslinking will be done after coating of the polymers.

Crosslinking agents that are usable in the present invention may be selected from the group consisting of triazine compounds; acrylated urethanes such as the diacrylated urethanes known under the trade designation EBECRYL, especially EBECRYL 230 (a polyurethane diacrylate available from Radcure Specialties, Inc., Norfolk Va.); hydrogen abstraction crosslinking compounds including copolymerizable mono-ethylenically unsaturated aromatic ketones, particularly 4-acryloxybenzophenone (ABP), as described in U.S. Pat. No. 4,737,559 (Kellen et al.), and post-added multifunctional benzophenones as described in U.S. Pat. No. 5,407,971 (Everaerts et al.), both of which are incorporated by reference; and multifunctional acrylates, such as 1,6-hexane diol diacrylate (HDDA).

Crosslinking agents are selected according to the polymerization method employed. Preferred crosslinking agents for adhesives prepared via photopolymerization on web are multifunctional acrylates such as 1,6-hexanediol diacrylate (HDDA) as well as those disclosed in U.S. Pat. No. 4,379,201 (Heilmann et al.), incorporated by reference herein, such as trimethylolpropane triacrylate, pentaerythritol tetraacrylate, 1,2-ethylene glycol diacrylate, and 1,12-dodecanediol diacrylate.

Also useful as crosslinkers are acrylate and methacrylate functional oligomers, like EBECRYL 230 which, in view of their higher molecular weight, have lower acrylate content than the lower molecular weight diacrylates, such as 1,6-hexanediol diacrylate and the like, mentioned above. To compensate for this lower acrylate content, higher weight percentages of the oligomeric multifunctional acrylates must be used in the adhesive composition.

Additional useful crosslinking agents include hydrogen abstraction type photocrosslinkers such as those based on benzophenones, acetophenones, anthraquinones, and the like. These crosslinking agents can be copolymerizable or non-copolymerizable. Examples of non-copolymerizable hydrogen abstraction crosslinking agents include benzophenone; anthraquinones, and radiation-activatable crosslinking agents such as those described in U.S. Pat. No. 5,407,971. Such agents have the general formula

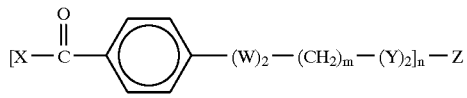

wherein W represents —O—, —N—, or —S—, X represents $CH_3$- or phenyl; Y represents a ketone, ester, or amide functionality; Z represents a polyfunctional organic segment that contains no hydrogen atoms more photoabstractable than hydrogen atoms of a polymer formed using the crosslinking agent; m represents an integer from 0 to 6; "a" represents 0 or 1; and n represents an integer of 2 or greater. Examples of copolymerizable hydrogen abstraction crosslinking compounds include mono-ethylenically unsaturated aromatic ketones, particularly 4-acryloxybenzophenone (ABP), as described in U.S. Pat. No. 4,737,559 (Kellen et al., incorporated herein by reference).

Copolymerizable α-cleavage type photoinitiators can also be employed, such as acrylamido-functional disubstituted acetyl aryl ketones, such as those described in assignee's PCT Application No. 94/10620, filed Sep. 16, 1994, which is incorporated herein by reference.

In addition, combinations of multi-functional (meth) acrylates and the hydrogen abstraction type crosslinkers or copolymerizable α-cleavage type photo initiators can be used. Low intensity UV light, such as "UV black light", is sufficient to induce crosslinking in most cases; however, when hydrogen abstraction type crosslinkers are used by themselves, high intensity UV exposure is necessary to achieve sufficient crosslinking at high line speeds. Such exposure can be provided by a mercury lamp processor such as those available from PPG, Pittsburgh, Pa., Aetek and others.

Yet another method for crosslinking that does not necessarily require addition of crosslinking agents is exposure to an electron-beam.

Other useful crosslinking agents include the substituted triazines, such as those disclosed in U.S. Pat. Nos. 4,329,384 and 4,330,590 (both to Vesley, both incorporated herein by reference), such as 2,4-bis(trichloromethyl)-6-p-methoxystyrene-s-triazine and the chromophore halomethyl-s-triazines.

Crosslinking agents useful in preparing solution polymerized heat-activatable adhesives of the invention are those which are free radically copolymerizable and which effect crosslinking through exposure to radiation, moisture or heat following polymerization. Such crosslinkers include the above mentioned photoactive substituted triazines and hydrogen abstraction type photocrosslinkers. Hydrolyzable, free radically copolymerizable crosslinkers such as monoethylenically unsaturated mono-, di-, and trialkoxy silane compounds including, but not limited to, 3-methacryloxypropyltrimethoxysilane (sold under the trade name "Silane A-174" by Union Carbide Chemicals and Plastics Co.), vinyldimethylethoxysilane, vinylmethyldiethoxysilane, vinyltriethoxysilane, vinyltrimethoxysilane, vinyltriphenoxysilane, and the like are also useful crosslinking agents.

Heat activated copolymerizable crosslinking agents, including but not limited to N-methylol acrylamide and acrylamido glycolic acid, can also be used to enhance the shear strength of the pressure-sensitive adhesive composition of the invention.

Multifunctional aziridines crosslinking agents may also be employed. Bisamide crosslinking agents are more fully described as compounds with the general formula (I):

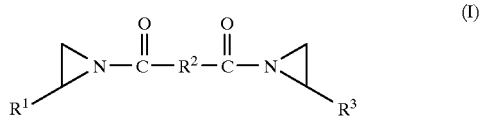

wherein $R^1$ and $R^3$ are the same or different and are independently selected from the group consisting of H and $C_nH_{2n+1}$, wherein n is an integer ranging from 1 to about 5, and $R^2$ is a divalent radical selected from the group consisting of benzeno ($-C_6H_4-$), substituted phenylene, and $C_mH_{2m}$, where m is an integer ranging from 1 to about 10. An example of a useful multifunctional aziridine within general formula I is N,N'-bis-1,2-propyleneisophthalamide, which has the following structure (general formula II):

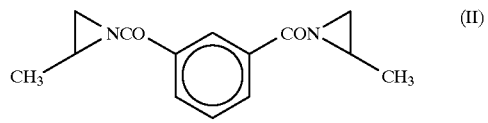

Other crosslinking agents can be used for the acid containing polymers of the invention. They include epoxies, isocyanates, and the like.

Adhesives of the invention can be polymerized by conventional free radical polymerization methods, whether thermally or radiation initiated, including solution and bulk polymerization processes. Preferred methods yield high molecular weight polymer without the use of solvents, such as obtained from suspension, emulsion and bulk polymerization. Particularly preferred is UV curing on the web, which yields the finished product in a single step.

Suitable thermal free radical initiators which may be utilized include but are not limited to azo compounds such as 2,2'-azobis(isobutyronitrile), hydroperoxides such as tert-butyl hydroperoxide, and peroxides such as benzoyl peroxide and cyclohexanone peroxide. Photoinitiators that are useful according to the invention include but are not limited to those selected from the group consisting of benzoin ethers such as benzoin methyl ether or benzoin isopropyl ether, substituted benzoin ethers such as anisole methyl ether, substituted acetophenones such as 2,2-diethoxyacetophenone and 2,2-dimethoxy-2-phenyl acetophenone, substituted alpha ketols such as 2-methyl-2-hydroxy propiophenone, aromatic sulfonyl chlorides such as 2-naphthalene sulfonyl chloride, and photoactive oximes.

For both thermal and radiation induced polymerizations, an initiator is present in an amount of about 0.01 to about 0.5 percent by weight based upon the total weight of the monomers of the instant heat-activatable adhesive compositions.

In one solution polymerization method, the high $T_g$ and low $T_g$ monomers and the functional monomer, along with a suitable inert organic solvent and free radically copolymerizable crosslinker are charged into a four-neck reaction vessel which is equipped with a stirrer, a thermometer, a condenser, addition funnel and a thermowatch. After this monomer mixture is charged into the reaction vessel, a concentrated thermal free radical initiator solution is added to the addition funnel. The whole reaction vessel and addition funnel and their contents are then purged with nitrogen to create an inert atmosphere. Once purged, the solution within the vessel is heated to about 55° C., the initiator is added, and the mixture is stirred during the course of the reaction. A 98 to 99 percent conversion should be obtained in about 20 hours.

Another polymerization method is a two step ultraviolet (UV) radiation initiated photopolymerization of a 100% solids monomer mixture. In the first step, the low viscosity monomers are mixed at the appropriate ratios and a photoinitiator is added to the mixture. The mixture is purged with nitrogen to remove dissolved oxygen. Short exposure to UV light results in a partially polymerized syrup with moderate viscosity that can be coated easily. Further photoinitiator and crosslinker are added to the syrup. The syrup is then coated while excluding oxygen at a desired thickness, usually about 0.5 to 10 mils (about 0.01 to 0.25 millimeters). During the coating process, the syrup is further exposed to a bank of UV lights to complete the polymerization and crosslink the adhesive.

An alternative to the above two step method involves the use of an extruder. In this method, a plastic pouch is filled with monomers and initiators, with the addition of chain transfer agents to keep the molecular weight low enough after polymerization so that the polymer can be extruded. The filled pouch is exposed to UV, which produces the polymerized composition inside the pouch. The pouch and contents are then fed to the extruder and the resulting molten composition hot melt coated onto a liner, after which it is then exposed again to UV or electron beam to crosslink the adhesive, to yield a composition comprising a high molecular weight heat-activatable adhesive having a small percentage of such plastic polymer material from the pouch therein, typically 3 weight percent or less.

Reactive extrusion, such as the continuous free radical polymerization methods described in U.S. Pat. Nos. 4,619,979 and 4,843,134 (both Kotnour et al., both incorporated herein by reference), may also be utilized to prepare the heat-activatable adhesives of the invention. Reactive extrusion is a solventless technology where the polymerization is initiated by thermal means as opposed to UV radiation. The monomers along with the initiator are fed to an extruder. The temperature along the extruder is varied to control the polymerization. Chain transfer agents are added to control the molecular weight and prevent gel formation. The adhesive obtained at the end of the extruder is hot melt coated and cured either by UV light or electron beam in order to improve its cohesive strength.

The formulation of the heat-activatable adhesive of the invention is summarized below:

| INGREDIENT | USEFUL | PREFERRED (ACIDIC FUNCTIONAL MONOMER) | PREFERRED (BASIC FUNCTIONAL MONOMER) |
|---|---|---|---|
| Low $T_g$ monomer | 10–85 | 10–40 | 10–40 |
| Functional monomer | 5–50 | 5–20 | 15–30 |
| High $T_g$ monomer | 10–70 | 25–60 | 25–60 |
| Crosslinker | 0.05–0.5* | 0.05–0.5* | 0.05–0.5* |
| Initiator | 0.05–0.3 | 0.05–0.3 | 0.05–0.3 |

*Can be as high as 20 wt-%.

The elastic modulus of the acrylic heat-activatable adhesive (measured by dynamic mechanical thermal analyzer, 628 rad/sec, compression mode) preferably ranges from about $5\times10^6$ to about $1\times10^8$ dyn/cm$^2$ at 30° C. When the elastic modulus is less than $5\times10^6$ dyn/cm$^2$ at 30° C. the initial tack or "pre-adhesion", which will be described below, is very high, similar to that of a pressure sensitive adhesive, so that air is likely to be trapped between the adhesive and the substrate during sheeting application. When the elastic modulus exceeds $1\times10^8$ dyn/cm$^2$, it becomes difficult to keep the sheet positioned at the time of provisional bonding even with the application of high pressure.

Therefore, if the elastic modulus is between about $5\times10^6$ and about $1\times10^8$ dyn/cm$^2$ at 30° C., optimal properties for convenient provisional bonding are provided. When the elastic modulus has such a value, the heat-activatable adhesive may be positioned as desired upon a substrate without sticking. When the heat-activatable adhesive is in the proper position, application of pressure results in a weak provisional bond to maintain the position. If repositioning is desired, the adhesive may be easily lifted from the substrate and repositioned. Application of pressure will again provide a temporary bond, maintaining position until the adhesive is heat-activated. A more preferred range of the elastic modulus at 30° C. is from about $7.5\times10^6$ to about $6.0\times10^7$ dyn/cm$^2$, particularly preferably from about $1.0\times10^7$ to about $3.6\times10^7$ dyn/cm$^2$.

In the present invention, the elastic modulus of the acrylic heat-activatable adhesive preferably ranges from about $5\times10^5$ to about $1\times10^7$ dyn/cm$^2$ at 70° C. When the elastic modulus is less than about $5\times10^5$ dyn/cm$^2$ at 70° C. the cohesive strength tends to be low, therefore, the adhesive tends to fail or stretch so severely that the sheeting can not hold on severely curved substrates, i.e. pop-off is a problem. On the other hand, when the elastic modulus exceeds $1\times10^7$ dyn/cm$^2$, it is difficult to carry out the final bonding at a heat press temperature of less than about 70° C. If the temperature is higher than 70° C., the retroreflectivity of the structured sheeting tends to decrease because of thermal distortion of the projections. When the elastic modulus is within the range, the final bonding at the low heat press temperature becomes easier and higher cohesive strength can be obtained. A more preferable range of the elastic modulus at 70° C. is from about $9.0\times10^5$ to about $8.0\times10^6$ dyn/cm$^2$, particularly preferably ranging from about $2.0\times10^6$ to about $6.0\times10^6$ dyn/cm$^2$.

The elastic modulus of the adhesives of the invention is a value measured at 30° C. and 70° C. by using dynamic mechanical thermal analyzer Model RSA II available from Rheometrics Co. The conditions for the measurement are as follows:

sample shape: cylindrical (outer diameter=3 to 3.5 mm, thickness=6 to 8 mm
temperature range: −60 to 160° C.
frequency: 6.28 rad/sec
measurement mode: compression mode.

The elastic modulus of the heat-activatable adhesives of the invention is evaluated at 30° C. because the ability to heat press at 70° C. and still also have suitable preadhesion tack at room temperature (i.e., about 25° C.) is required for adhesives useful in the present invention. The term "heat press temperature" represents a value of the surface temperature of the retroreflective sheet measured by using a thermocouple.

Other additives, such as an ultraviolet ("UV") absorber, an anti-oxidant, a viscosity increasing agent, tackifiers, inorganic particles, etc., can be added to the heat-activatable adhesives of the invention to the extent they do not interfere with polymerization, severely reduce the desired transparency, substantially adversely affect the glass transition temperature or the elastic modulus of the adhesives.

The adhesives of the invention are useful in the production of many different sheeting or film-type products, particularly those wherein optical clarity is desired. One application of the adhesive is in a structured sheeting as shown in FIG. 1.

In FIG. 1, cube-corner sheeting 7 comprises an overlay or cover film 1 and structured layer 2 having cube corner elements on the rear surface thereof. The overlay film is typically and preferably polymethylmethacrylate ("PMMA") containing a UV absorber to prevent degradation, while the retroreflective cube corner elements are preferably made of polycarbonate resin. It is 32 understood that the present invention may be used with any cube corner optical design appropriate for the desired application. Illustrative examples of some cube corner element designs that can be used in the invention are disclosed in U.S. Pat. Nos. 4,588,258 (Hoopman); 4,775,219 (Appeldorn); and 5,138,488 (Szczech). Structured sheeting 7 may also comprise a substantially totally internally reflecting film comprising a plurality of parallel prisms, such as described in U.S. Pat. Nos. 4,805,984 (Cobb); 4,906,070 (Cobb); 5,056,892 (Cobb); 5,175,030 (Lu); or 5,183,597 (Lu).

The precisely shaped elements of structured layer 2 and sealing layer 3 define a plurality of concavities 10, filled with air or other fluid. "Substantially totally internally reflecting" pertains to the optical quality of the film, and means that the film has a T-Test Value of 5 percent or less, wherein the T-Test is as defined below.

The optical quality of a retroreflective film can be evaluated with apparatus including a laser (such as a SPECTRA-PHYSICS Brand Model 117A) with a spatial filter, a beam expander, and a collimator. Two diaphragms or irises are placed 18 and 38 cm from the laser, and an annular sample holder with an opening 6.35 cm in diameter is placed 84 cm from the laser. Directly behind the sample holder is an integrating sphere (with a 3 cm diameter aperture) and a LABSPHERE Brand ML-400 radiometer.

Using the diaphragms or irises, the laser is focused through the aperture to obtain a clean circle of light of about 3 mm diameter on a black surface mounted on the sample holder. A source intensity measurement of 100 percent is taken with no sample in place. The TIRF (Totally Internally Reflecting Film) to be tested is then mounted on the sample holder with its flat surface facing the laser and its grooves extending vertically. Unless otherwise reported, T-Test Values are measured at ambient temperature. Readings are then made at from 12 to 15 different points on the TIRF within a 5 cm diameter area while making sure that none of the light strikes the frame of the sample holder. The readings are averaged and multiplied by 100 to give percent transmission which is the T-Test Value of the TIRF sample. T-Test Value is a criterion of the fidelity of replication of the TIRF. Smaller T-Test Value percentages indicate better fidelity of replication than larger percentages, and a T-Test Value of 5 percent or less indicates that the film is substantially totally internally reflecting.

Overlay film 1 preferably comprises an acrylic material having excellent durability, such as poly(methyl) methacrylate, a polyester such as, for example, polyethylene terephthalate, polyamide, polycarbonate, poly (vinylchloride), poly(vinylidinechloride), cellulose acetate butyrate, cellulose acetate propionate, poly(ethersulfone), polyurethane, ionomer resins such as the metal ion crosslinked polyethylene/acrylic acid ionomers known under the trade designation SURLYN, and the like, and preferably also comprises a UV absorber.

From the aspects of mechanical strength and light reflectivity, layer 2 preferably has a refractive index of about 1.6, which is possible if the layer is made of a polycarbonate resin, an ionomer resin as described above, or an acrylic resin. In the case of cube corner retroreflective articles, the length of the base of the pyramidal cube corner element preferably ranges from about 0.1 to about 3.0 millimeter ("mm"), and more preferably ranges from about 0.2 to about 1.0 mm, in order to secure good retroreflectivity and wide angle property. For flexible articles of the invention such as those to be used on clothing, a length of up to 0.625 mm is preferable.

Structured sheeting 7 may be made as one integral material, e.g. by embossing a preformed sheet with a described array of cube-corner elements or casting a fluid material into a mold; or they may be made as a layered product, e.g. by casting the elements against a preformed film as taught in U.S. Pat. No. 3,684,348, or by laminating a preformed film over the front face of individual molded elements. Polycarbonates and ionomers are preferred integral sheet materials.

The thickness of structured sheeting 7 preferably ranges from about 50 to about 500 micrometers in terms of the height from the apex of the cube corner element or prism to the base of the base portion. If the thickness is less than 50 micrometers, the mechanical strength of the sheeting may not be sufficient and a predetermined height is typically difficult to obtain for the pyramids or prisms, such that retroreflectivity decreases. If the thickness exceeds 500 micrometers, on the other hand, the total thickness of the retroreflective sheet becomes so thick that handling becomes difficult and the amount of adhesive required increases.

As stated above, the overlay film should be light transmissible and preferably is substantially transparent. The polymer used in the overlay film preferably comprises a moderate elastic modulus polymer for bending, curling, flexing, conforming, or stretching. The polymer used in the overlay film also preferably has ductility, which can be expressed in terms of Youngs modulus. The Youngs modulus can be about $0.7 \times 10^5$ to $5.7 \times 10^5$ psi, and is preferably about $2.5 \times 10^5$ to $4.0 \times 10^5$ psi. The polymer should retain its physical integrity at the temperatures at which it is applied to the cube-corner layer, and desirably has a Vicat softening temperature that is greater than about 50° C.

Examples of polymers that can be used in the overlay film include, but are not limited to: fluorinated polymers such as poly(chlorotrifluoroethylene), which is available, for example, under the trade designation KEL-F800 from 3M Co., St. Paul, Minn., poly(tetrafluoroethylene-co-hexafluoropropylene), which is available, for example, under the trade designation EXAC FEP from Norton Performance, Brampton, Mass., poly(tetrafluoroethylene-co-perfluoro(alkyl)vinylether), which is available, for example, under the trade designation EXAC PEA from Norton Performance, and poly(vinylidene fluoride) or poly (vinylidene fluoride-co-hexafluoropropylene), which are available under the trade designation KYNAR from Pennwalt Corporation, Philadelphia, Pa.; ionomeric ethylene copolymers such as poly(ethylene-co-methacrylic acid) with sodium or zinc ions, which are available under the trade designations SURLYN-8920 and SURLYN-9910 from E.I. duPont de Nemours, Wilmington, Del.; low density polyethylenes such as low density polyethylene, linear low density polyethylene, and very low density polyethylene, plasticized vinyl halide polymers such as plasticized poly (vinylchloride); polyethylene copolymers including acid functional polymers such as poly(ethylene-co-acrylic acid) and poly(ethylene-co-methacrylic acid), poly(ethylene-co-maleic acid), and poly(ethylene-co-fumaric acid); acrylic functional polymers such as polymethylmethacrylate, poly (ethylene-co-alkylacrylates) where the alkyl group is methyl, ethyl, propyl, butyl, etc., or $CH_3(CH_2)_n$- where n is 0–12, and poly(ethylene-co-vinylacetate); and aliphatic and aromatic polyurethanes derived from diisocyanates such as dicyclohexylmethane-4,4'-diisocyanate, isophorone diisocyanate, 1,6-hexamethylene diisocyanate, cyclohexyl diisocyanate, diphenylmethane diisocyanate, and combinations of these diisocyanates, polydiols such as polypentyleneadipate glycol, polytetramethylene ether glycol, polyethylene glycol, polycaprolactone diol, poly-1,2-butylene oxide glycol, and combinations of these polydiols, and chain extenders such as butanediol or hexanediol. Commercially available urethane polymers include PN-03 or 3429 from Morton International Inc., Seabrook, N.H., or X-4107 from B. F. Goodrich Company, Cleveland, Ohio. Combinations of the above polymers also may be used in the overlay film.

Preferred polymers for the overlay film include fluorinated polymers such as poly(vinylidene fluoride) (PVDF), acrylic functional polymers such as polymethylmethacrylate (PMMA), and combinations thereof. A particularly preferred group of polymers includes blends of PVDF and PMMA that contain about 60–95 weight percent PMMA and about 5–40 weight percent PVDF. In these blends, the PMMA contributes to the durability of the overlay film whereas the PVDF contributes to the chemical (e.g., organic solvent) stability and flexibility of the overlay film. Preferably, the PMMA is not impact modified. Such PMMA materials are also referred to as "straight" PMMA. Suitable sources of "straight" PMMA include Rohm & Haas V044, V045, V052, V081 and the like. PVDF is available from Soltex Polymer Corp., Houston, Tex. under the trade designation SOLEF or SOLVEY, from Pennwalt Corporation under the trade designations KYNAR® 1010 and 1008, and from Elfatochem North America Inc., Philadelphia, Pa. under the trade designations TEDLAR 710 and 720. These polymers are preferred for one or more of the following reasons: suitable mechanical properties; good adhesion to the cube-corner film; clarity; enhanced solvent inertness; and environmental stability.

The overlay film can be a single layer or a multi-layer film as desired. The interfacial adhesion between the overlay film and the cube-corner film can be improved by placing a thin tie-layer therebetween. In addition, a surface treatment method, such as an electrical discharge method (e.g., a corona or plasma treatment) can be used to further improve the adhesion of tie-layer to the overlay film or the tie-layer to the cube-corner layer. Typically, however, a tie layer or surface treatment methods are not required in the embodiments of the present invention.

The polymeric materials used in the cube-corner layer and overlay film can include additives such as acid scavengers and UV absorbers. These are particularly useful to prevent degradation of the polymeric material during processing and upon exposure to environmental conditions (e.g., heat and UV radiation). Examples of UV absorbers include derivatives of benzotriazole such as those available under the trade designations TINUVIN 327, 328, 900, 1130, and TINUVIN-P from Ciba-Geigy Corporation, Ardsley, N.Y.; chemical derivatives of benzophenone such as those available under the trade designations UVINYL-M40, 408, and D-50 from BASF Corporation, Clifton, N.J.; and other related benzophenone derivatives such as those available under the trade designations SYNTASE 230, 800, 1200 from Neville-Synthese Organics.

Colored sealing film 3 is laminated onto the structured surface of layer 2 and is bonded thereto with heat and/or radiation at a plurality of locations, thus forming a plurality of sealed air pockets. When describing the pockets, "air" is used only as an example. Other fluids may be used, depending on the atmosphere in which the articles of the invention are produced, and provided that the fluid used is significantly different in refractive index from layer 2, with a difference in refractive indices of about 0.5 or more preferred. The procedures of U.S. Pat. No. 4,025,159 (McGrath) may be used to effect the bonding of colored sealing film 3 to the structured second surface of layer 2.

Colored sealing film 3 is preferably a plastic film comprising a plastic resin such as polyester that contains a suitable amount of one or more pigments such as titanium oxide, silica, red oxide, and the like, to impart desired color. Illustrative examples of colors include white, gray, red, yellow, green, orange, blue, and brown. Colorants such as dyes and pigments may be used to impart desired color to sealing layer 3 as is appropriate for the intended application. Those skilled in the art will be able to readily select suitable colorants and colorant loadings for intended applications.

White and gray are typically preferred for the present invention because recognizability of the retroreflective articles of the invention is high when these colors are used.

A particularly preferred resin for forming the colored sealing film layer is often polyester resin because the pigment can be easily added to the resin. However, bonding of polyester films to adhesive layers can be difficult.

In the present invention, an optional chemical primer layer or a corona treatment layer is preferably disposed between colored sealing film 3 and heat-activatable adhesive layer 5. When a chemical primer layer and/or corona treatment is employed, inter-layer adhesion between the colored sealing layer film 3 and heat-activatable adhesive layer 5 can be improved, making possible high adhesion of articles of the invention to a substrate.

Illustrative examples of suitable chemical primer layer types include urethanes, silicones, epoxy resins, vinyl acetate resins, ethyleneimines, and the like. Selection of a suitable primer layer or treatment will be dependent in part upon the characteristics of sealing film 3, adhesive layer 5, and the conditions under which the resultant article will be used. Urethane and silicone types are particularly effective chemical primers for polyester colored sealing films. One suitable silicone type of primer layer has a continuous gelled network structure of inorganic particles, and is described in Japanese Unexamined Pat. Publication (Kokai) No. 2-200476. This primer layer has a strong affinity for polyester resins and polyolefin resins. Illustrative examples of chemical primers for vinyl and polyethylene terephthalate films include the crosslinked acrylic ester/acrylic acid copolymers disclosed in U.S. Pat. No. 3,578,622 (Brown).

The acrylic adhesives of the invention generally adhere well to many surfaces. However, in some cases it may be useful to enhance the adhesion to a substrate by enhancing the mechanical interlocking of the adhesive with the substrate which can be done, for example, by abrasion or etching of the substrate or priming with a material which significantly increases the surface area for the adhesive to adhere to, such as the Msol priming discussed below. The acrylic adhesives used for this invention contain functional monomers, such as acrylic acid or N,N-dimethylacrylamide. These functional monomers can strongly interact with chemical primers by such mechanisms as hydrogen bonding, acid-base interaction or reaction across the adhesive/primer interface.

The thickness of the chemical primer layer is suitably within the range of 10 to 3,000 nanometers ("nm"). If the thickness is less than 10 nm, the primer effect is minimal; if it exceeds 3,000 nm, on the other hand, inter-layer peel is likely to occur in the primer layer.

Corona treatment is a preferred physical priming that can be suitably applied to the surface of the colored sealing film layer onto which is then coated the adhesive of the present invention. Corona treatment not only improves the inter-layer adhesion between the adhesive and the colored sealing film but provides an advantage in the production process in that it can be separately applied after structured sheeting 7 and colored sealing film layer 3 are sealed.

A surface treatment 4 is preferred to obtain strong adhesion between the sealing film and the heat-activatable adhesive layer 5 as illustrated in FIG. 1. In general, surface treatments may be described as chemical treatments, physical treatments, and combinations thereof, so that the following illustrative surface treatments may be appropriate:

1) Aliphatic polyurethane primer coating (applied after corona treatment), an example of which is as follows (amounts in parts by weight):

TABLE A

| Amount | Component |
|---|---|
| 58.28 | NEOREZ R-960 aliphatic polyurethane (Zeneca Resins) |
| 31.09 | Deionized water |
| 1.56 | CX-100 multifunctional aziridine (Zeneca Resins) |
| 0.03 | Calcofluor Dye (BASF) |
| 8.77 | Ethanol |
| 0.77 | FC 93 fluorochemical (Sumitomo 3M Co.) |
| 0.20 | Bubble Breaker 3056A (Witco Corp.) |

2) Msol primer coating after corona treatment. The technology of Msol primer is based on Assignee's Japanese Patent J02200476-A, an example of which is presented in Table B (amounts in parts by weight):

TABLE B

| Amount | Component |
|---|---|
| 67.56 | Deionized water |
| 31.63 | Nalco 2326, colloidal silica (Nalco Chemical Co.) |
| 0.41 | A-1100 silane coupling agent (Nippon Yunika) |
| 0.40 | Triton X-100 surfactant 10 weight percent aqueous solution (Rohm & Haas) |

3) Nitrogen corona treatment.

Corona treatment of the surface in the present invention can be suitably carried out in a nitrogen atmosphere because the duration of the improvement of inter-layer adhesion is high. The useful energy density of the nitrogen corono treatment ranges from about 15 to 500 watts/meter$^2$/minutes, preferably about 80 to 250 watts/meter²/minute. The energy density can be calculated from the equation $$\underset{(\text{watts/meter}^2/\text{minute})}{\text{EnergyDensity}} = \frac{\text{Net Power}(W)}{\text{Electrode Width}(m) \times \text{Line Speed}(cm/mm)}$$

wherein the electrode width is 0.035 m and the net power and line speed can be changed to obtain the desired energy density.

Corona treatment of films is a well-known technique, and is described generally in Cramm, R. H., and Bibee, D. V., *The Theory and Practice of Corona Treatment for Improving Adhesion*, TAPPI, Vol. 65, No. 8, pp 75–78 (August 1982).

Figure 2:
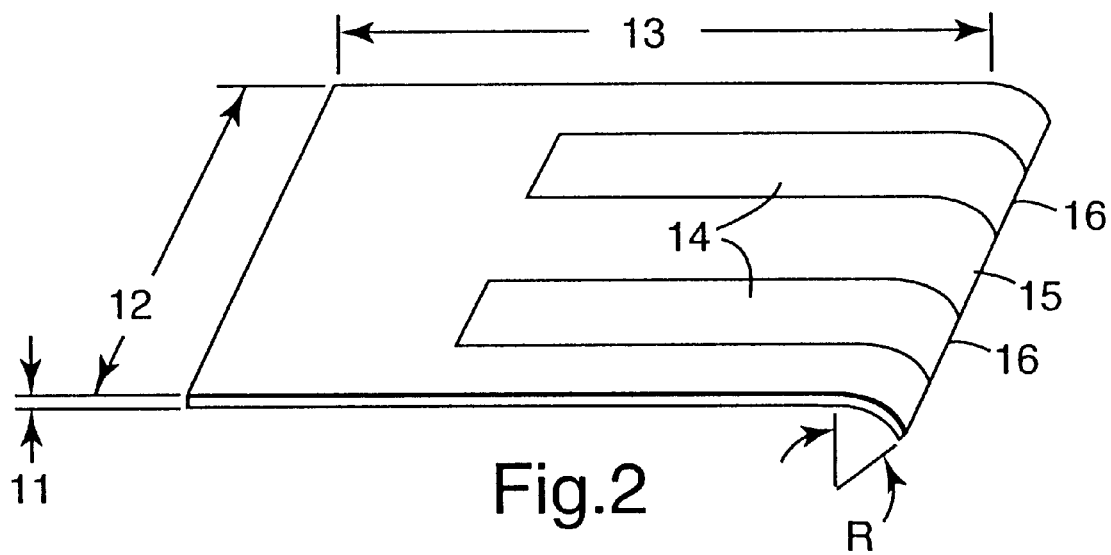
FIG. 2 is a perspective view of a signage article made in accordance with the present invention, also illustrating schematically the round edge test.

The heat activatable adhesive of the invention may be used in the manufacture of a variety of different articles some of which are illustrated in FIGS. 2 to 5. FIG. 2 depicts, in perspective view, a signage article made using the heat-activatable adhesive of the invention. The article, having the desired thickness 11, width 12 and flat length 13, also has a round edge 15. The curvature of the round edge is indicated by the radius R. Retroreflective sheeting articles 14 are adhered to the article by a layer of the heat-activatable adhesive of the invention and remain in place without "pop-off" at the edge of the retroreflective sheeting articles 16.

Figure 3:
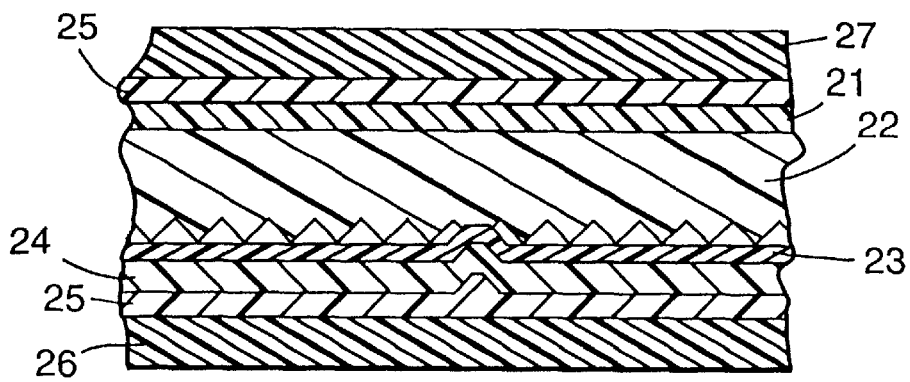
FIG. 3 is a cross-sectional view of a traffic control retroreflective sheeting with overlay film made according to the invention.

FIG. 3 shows a heat activatable traffic control retroreflective sheeting in cross-section similar to the retroreflective sheetings described earlier. In this article overlay film 21 is bonded to prismatic layer 22. The prism layer 22 has a sealing film 23 bonded to its structured surface with a plurality of sealed air pockets formed between the two layers as described in detail for FIG. 1 above. The sealing film layer is bonded to a primer layer 24 which may be, for example, the Msol primer layer described in Table B. A polyurethane type primer coating as described in Table A, a corona treatment, and so on. The heat activatable adhesive layer 25 is disposed upon the primer layer 24 and a protective release liner 26 is disposed upon the heat activatable adhesive layer to protect the adhesive and which is to be removed prior to heat lamination.

The retroreflective sheetings of the invention may optionally also comprise a further film layer 27 which has protective properties. Examples of suitable films are those films having anti-graffiti, anti-dew, anti-moisture, chemical, heat and/or impact resistant films. If such a film is used it is bonded to overlay film 21 with a layer of the heat-activatable adhesive of the invention 25.

Figure 4:
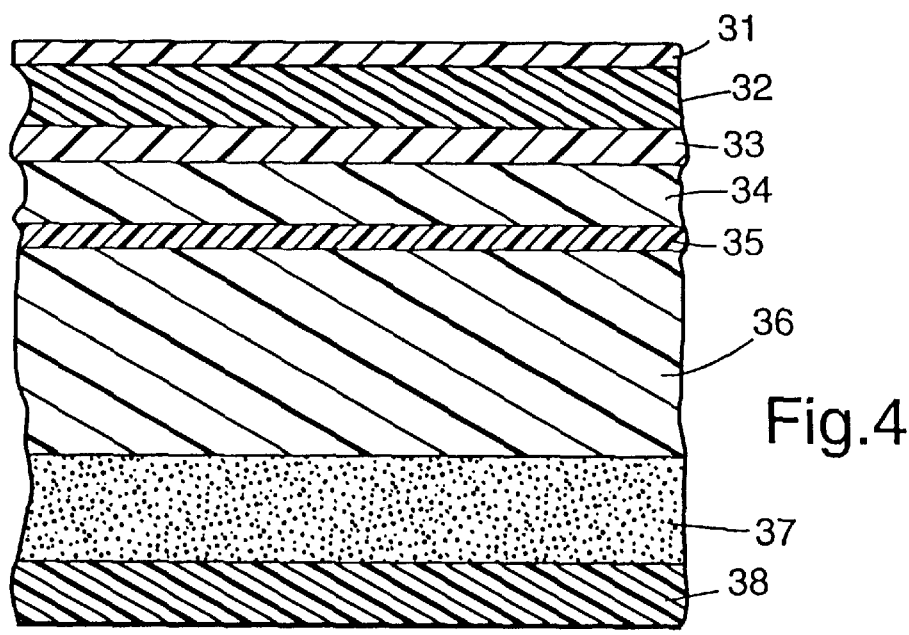
FIGS. 4 and 5 are cross-sectional views of graphics and/or decorative sheetings made according to the invention.

In addition to the use in the preparation of retroreflective sheetings, the heat activatable adhesive of the invention may be used in the preparation of graphic or decorative film as seen in FIG. 4. For example, the heat activatable adhesive may be used to adhere a stain or heat resistant overlay onto a decorative film product, allowing it to be used in heavy use applications such as for table tops, bar counters, kitchen counters and so on. An illustrative graphics film is depicted in cross-section in FIG. 4.

The graphics film of FIG. 4 has a hard coat 31 that is a heat, stain and/or chemically resistant film which protects the remainder of the sheeting. This hard coat layer may be made up of any suitable polymeric material, but is preferably a UV curable acrylic resin. This hard coat 31 is followed by a transparent film layer 32, e.g., a polyester film, that is used to smooth the graphics film and obtain excellent hardness together with the hard coat. This transparent film is useful to prevent plasticizer migration so that excellent stain resistance can be obtained. This film is bonded by a layer of the heat-activatable adhesive 33 containing a basic functional monomer such as NNDMA to a layer of clear PVC 36. A printed or other decorative layer 35 may be adhered to the clear PVC layer followed by a base layer of colored PVC 36. A layer of pressure sensitive adhesive 37 is disposed on the surface of the base colored PVC with protective release liner 38 on the surface of the pressure sensitive adhesive.

Figure 5:
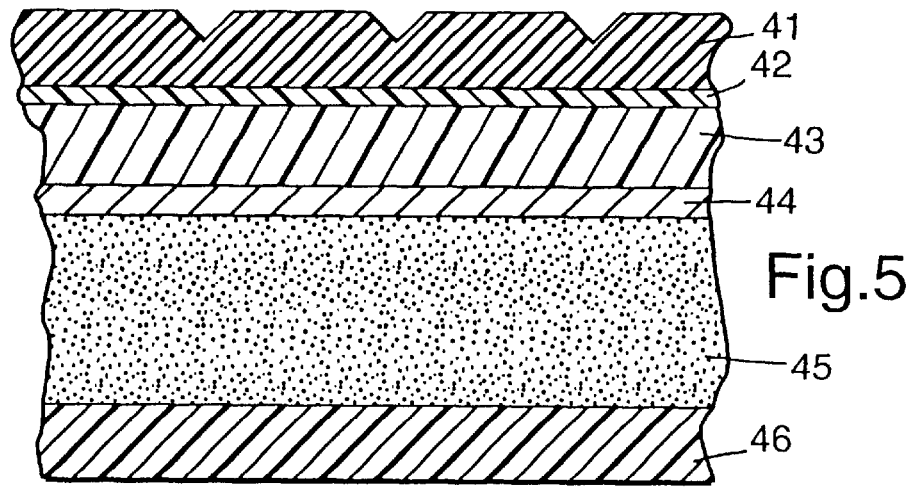

In an additional graphics application as shown in FIG. 5, a layer of clear PVC 41, optionally with a pattern embossed into its surface, has a layer of decorative printing 42 attached to its back or smooth surface. A layer 43 of the heat activatable adhesive of the invention is disposed on the surface of the printing layer. Although optical clarity is not critical in this particular application, low heat activation temperature is desirable in view of the heat sensitivity of PVC film. A layer of aluminum or other metal foil 44 is disposed on the surface of the heat activatable adhesive. Upon this surface is a layer of pressure sensitive adhesive 45 to attach the article to the desired substrate. On the surface of the pressure sensitive adhesive is a protective release liner 46 to protect the surface of the adhesive.

When microreplicated film with optical properties such as that described in U.S. Pat. No. 4,775,219 (Appledorn) must be laminated to typically glass surfaces, the adhesive used in the lamination must be optically clear so as to leave the microreplicated films with the intended optical quality and they must be heat activatable at a moderate temperature to prevent distortion of the films and its resulting optical changes. For example, the heat-activatable adhesive of the invention may be used to laminate or adhere a film, such as a microreplicated film, directly to a glass surface such as a computer screen or other monitor. In other applications such as an automotive or other window type applications, the film will typically be laminated in a "sandwich" configuration between two glass panels.

Clearly, the heat activatable adhesive of the invention is useful in a wide range of sheeting or overlay products having a multitude of end uses ranging from light or optics control to anti-graffiti film to retroreflective articles. The figures described above are not to scale and are intended to not limit but illustrate the invention.

EXAMPLES

The invention will be further explained by the following illustrative examples which are intended to be non-limiting. Unless otherwise indicated, all amounts are expressed in parts by weight.

In the examples which follow, the monomers of alkylacrylate and functional monomer were mixed at respective weight percentages indicated in each example, with 0.1 weight percent of the photoinitiator known under the trade designation ESACURE KB-1, 2,2-dimethoxy-2-phenylacetophenone available from Sartomer Co. The resulting solutions were deaerated for 10 minutes with nitrogen gas, and then polymerized to 8–12 percent conversion by using low intensity UV lamps under nitrogen gas. Polymerization can be stopped by exposure to oxygen.

Various kinds of crosslinkers and additional 0.2 percent of photoinitiator were added into the syrup solution and then mixed completely. The crosslinkers used in the examples were 1,6-hexanediol diacrylate (HDDA), XL-353 triazine available from 3M, which is 2,4-bis(trichloromethyl)-6-(3,4 dimethoxy-phenyl)-s-triazine, 4-acryloxybenzophenone (ABP), and urethane diacrylate (EBECRYL 230 available from Radcure Specialties).

The following two curing procedures were employed.

I. Open Face Curing

The syrup solutions containing XL-353 crosslinker were coated onto siliconized paper liner at 4 mil (0.01 cm) bar setting and the web was irradiated with a low intensity UV lamp (UV Blacklight from Sylvania, emitting between 300 and 400 nm with a peak around 350 nm and an intensity around 2 mW cm$^{-2}$) under nitrogen gas. The total dose of the UV light was 420.7 millijoules/square centimeter ("mj/cm$^2$"), II. Dual Liner Curing The syrup solutions containing HDDA, ABP, and urethane diacrylate were coated onto siliconized paper liner at 4 mil (0.01 cm) bar setting and a siliconized polyester film was laminated to the web. The sandwiched web ran through a low intensity UV lamp which total dose was 444.2 mj/cm$^2$.

In the case of ABP containing syrup, the web was irradiated with a high intensity UV lamp after the low intensity UV light irradiation. The total dose of high intensity UV light was 429.0 mj/cm$^2$.

The total dose was measured by UVIMAP radiometer (Electronic Instrumentation and Technology, Inc.).

The heat-activatable adhesives can also be obtained from solvent polymerization, however, the adhesives may exhibit slightly different properties as those cured by UV polymerization. For example, the holding power on highly curved surfaces may be lower and the samples may be better suited for flatter surface applications.

Example 1

60 weight percent isooctyl acrylate, 10 weight percent acrylic acid, and 30 weight percent isobornyl acrylate were mixed with 0.1 weight percent of photoinitiator (Sartomer Co., ESCACURE KB-1). The resulting solution was deaerated for 10 minutes with nitrogen gas, and then was polymerized up to 8.7 percent conversion by using a low intensity UV lamp under nitrogen gas. The polymerization was stopped by exposing the solution to air.

0.2 part by weight, based on total weight of monomers, of triazine (XL-353) and 0.2 weight percent of additional photoinitiator were added to 100 parts by weight of the syrup solution and were mixed completely.

The syrup solution was coated on the siliconized paper liner at 4 mil (0.01 cm) bar setting and the web was irradiated with a low intensity UV lamp under nitrogen gas. The total dose of the UV light was 420.7 mj/cm$^2$.

The elastic modulus at 30° C. and 70° C., transparency, glass transition temperature, pre-adhesion, and post-adhesion are shown in Table 1. The test methods of those measurements were as follows:

Elastic modulus: described above.

Transparency:

The cured heat activatable adhesive, which was coated at 4 mil bar setting, is laminated with 50 μm Toyobo polyester film A4100 on both sides of the adhesive and the sample is measured by an integrating-sphere photometer according to section 5.5 in JIS K7105.

Glass transition temperature: described above.

Pre-adhesion:

A heat-activatable adhesive was coated on the siliconized paper liner at 4 mil (0.01 cm) bar setting and cured, and then 50 μm aluminum foil was laminated to the adhesive at 70° C. by a heat laminator. The sample was cut to 1 inch (2.54 cm) width and the test piece permitted to equilibrate at 20±2° C. and 65±5 percent relative humidity (as per test standard JIS Z8703) for 24 hours. A 3 mm thick polycarbonate substrate was wiped with isopropyl alcohol, and then the test piece was laminated to the substrate by means of an automatic laminator with 5 mm/second lamination speed as described in JIS Z0237. Just after lamination, the release force was measured by a tensile tester known under the trade designation INSTRON with 90° peel and 300 mm/minute peel rate. The pre-adhesion was defined as the averaged release force of three measurements.

Post-Adhesion

The same method as above was used to measure post-adhesion, except with the following changes: use of 80 μm aluminum foil and 1 mm of aluminum panel as the test substrate, and HLVA for final bonding before measurement. The heat applicable cube-corner retroreflective sheeting was made by the same method described above except the use of Msol primed cube-corner retroreflective sheeting instead of the siliconized paper liner, that is direct coated onto the sheeting. The properties of these sheeting are shown in Table 2 below. The methods of the measurements are described below:

Whiteness:

The whiteness was measured in terms of Cap Y(D65/2°) by use of Color meter Σ 80 (Nipping Denshoku Kogyoh). A higher Cap Y value means the whiteness is higher. The color of the white sheeting should stay in the following color box: 1(x=0.305, y=0.305), 2(x=0.355. y=0.355), 3(x=0.355, y=0.375), 4(x=0.285, y=0.325). See ASTM Standards on Color and Appearance Measurements, Standard E308.

Provisional bonding performance:

Ease of positioning of the cube corner retroreflective sheeting in this embodiment to a predetermined bonding site (an aluminum substrate for a road sign) was evaluated. Where positioning was easily accomplished and a provisional or temporary bond was formed upon application of pressure, it was evaluated as "Excel" for excellent, where the reflective sheeting did not adhere but could slide along the aluminum surface with low friction it was evaluated as "Slide" for undesirable sliding of the sheeting; and where the sheeting was aggressively tacky so that it could not be peeled off easily by hand it was evaluated as "Tack" for positioning of the sheeting was impossible due to excessively high tack.

HLVA application temperature (heat press temperature)

The temperature of HLVA application when the cube corner retroreflective sheeting was bonded to the aluminum substrate of the road sign was measured by bringing a thermocouple into contact with the surface of the sheeting.

Retroreflectivity loss after HLVA application:

The percentage of the retroreflectivity loss measured after the cube corner sheeting was bonded the aluminum substrate for the road sign as described above was evaluated using retroreflectivity before bonding as 100 percent. The retroreflectivity was measured at angle conditions of 0.2° observation angle and −4° entrance angle.

Bonding Test:

90° peel adhesion of the cube-corner retroreflective sheeting was carried out after HLVA application based on JIS Z0237. The case where the peel force was greater than 1.5 kilograms-force/inch ("kgf/in") or the sheeting could not be peeled off without damage of sheeting was evaluated as "Excel" for excellent, and the case where peel occurred between the adhesive layer and the sheeting was evaluated as "Delam" for delamination.

Round Edge Test:

Test panels with radius ranging from 3 to 10 mm were made as shown in FIG. 2. The size of the panel was 1.5×70×110 mm. Two pieces of 1 inch (2.54 cm) width sample of a heat applicable cube corner retroreflective sheeting were applied by HLVA to the panels after wiping with an 2%. aqueous solution of a non-ionic emulsifier (alkylphenylether of polyethylene glycol). The HLVA application temperature was chosen as shown in Table 2 and 4. After each test piece (substrate having the samples bonded thereto) was cooled, the edges of the test samples which protruded were trimmed. In this way, the test samples were bonded to substrates having the radii of curvature of 3 to 10 mm, and the environment aging test was carried out in 14 cycles under the condition listed below so as to observe pop-off failure of the retroreflective sheet from the curved surface. As a result, the minimum value of the radius of curvature of each test piece substrate, in which pop-off removal of the retroreflective sheet was not observed for two test samples, was used as the test result. Radius=3, 4, 5, 6, 7, 8, 9 and 10 mm.

1 cycle condition of environment aging test*
1. –30° C., 0 percent RH (relative humidity) (2 hours) ~(1 hour)~
2. 23° C., 65 percent RH (0.5 hour) ~(0.5 hour)~
3. 40° C., 95 percent RH (2 hours) ~(0.5 hour)~
4. 23° C., 65 percent RH (0.5 hour) ~(0.5 h)~
5. –30° C., 0 percent RH (1.5 hour) ~(1 h)~
6. 23° C., 65 percent RH (0.5 hour) ~(1 hour)~
7. 80° C., 50 percent RH (1 hour) ~(1 h)~
8. 23° C., 65 percent RH (0.5 hour)

*The cycle conditions were originally used in the automotive industry to provide a correlation to outdoor weatherability. The first time listed in each step is the length of time the sample is permitted to stand at the indicated conditions. The time between two different conditions, for example ~(1 hour)~, is an interval to change to reach the next condition.

Example 2

The same procedure as Example 1 was performed except 0.4 parts by weight of triazine (XL-353) crosslinker was added. The findings are shown in Table 1 and 2.

Example 3

The same procedure as Example 1 was performed except 0.6 parts by weight of triazine (XL-353) crosslinker was added. The findings are shown in Table 1 and 2.

Example 4

The same procedure as Example 1 was performed except 0.2 parts by weight of ABP crosslinker was added and the dual liner process was used. This time the sheeting was primed with NEOREZ.

Example 5

The same procedure as Example 4 was performed except an additional 0.2 parts by weight of ABP crosslinker was added instead. The findings are shown in Table 1 and 2.

Example 6

The same procedure as Example 4 was performed except an additional 0.4 parts by weight of ABP crosslinker was added. The findings are shown in Table 1 and 2.

Example 7

The same procedure as Example 4 was performed except n-butyl acrylate was used instead of isooctyl acrylate and 0.1 parts by weight of HDDA crosslinker was added. The sheeting was also primed with M-sol solution. The findings are shown in Table 1 and 2.

Example 8

The same procedure as Example 7 was performed except 4.4 parts by weight of urethane diacrylate (Ebecryl 230) crosslinker was added and the sheeting was primed using nitrogen corona. The findings are shown in Table 1 and 2.

Example 9

The same procedure as Example 8 was performed except 8.8 parts by weight of urethane diacrylate (EBECRYL 230) crosslinker was added. The findings are shown in Table 1 and 2.

Example 10

The same procedure as Example 8 was performed except 13.2 parts by weight of urethane diacrylate (EBECRYL 230) crosslinker was added. The findings are shown in Table 1 and 2.

Example 11

The same procedure as Example 8 was performed except 81 weight percent isooctyl acrylate and 19 weight percent of acrylic acid were used and 0.2 parts by weight of HDDA crosslinker was added. The findings are shown in Table 1 and 2.

Example 12

120 g of methylmethacrylate, 40 g of N,N-dimethyl acrylamide and 40 g isooctylacrylate were charged to a reaction vessel containing 300 g ethylacetate and 0.6 g VAZO™ 64 (DuPont Chemical). The vessel was purged with nitrogen, sealed and agitated for 24 hours in a water bath at 55 degrees Celsius. The resulting polymer can be diluted with ethylacetate to 30% solids and coated to yield an optically clear, non-tacky film.

This film adhesive is positionable up to 70° C. and can be heat-laminated around 110° C. between two pieces of plasticized vinyl (Panaflex™ available from 3M Company) to yield a strong bond. After aging (9 days at 65° C.), the two PVC pieces can no longer be separated without destruction of the vinyl.

Example 13

The same charges and reaction conditions were used as in Example 12, but we also charged 0.2 g of carbon tetrabromide to reduce the molecular weight of the polymer. The polymer can be coated at 40% solids to yield a clear, non-tacky film which remains positionable to around 70° C., yet will heat-laminate to PVC around 110° C. Again, a very good bond was obtained.

Example 14

The same charges as in Example 12 were used, except the methylmethacrylate was replaced with ethylmethacrylate. Solution coating yields a clear, non-tacky film which remains positionable up to about 50° C., yet is heat-laminatable to plasticized vinyl around 90° C. and gives a strong bond.

Example 15

The same charges as in Example 13 were used, but methylmethacrylate was replaced with ethylmethacrylate. Solution coating yields a clear film with very slight tack but positionable up to around 50° C.

Heat lamination to plasticized vinyl at 90° C. yields a strong bond.

The samples above demonstrate that optically clear adhesives with good heat-activatable properties for PVC application can be obtained from solution.

In order to eliminate solvents from the process, we can suspension polymerize the monomers but we would need an additional step to convert polymer beads into a thin coating. Bulk polymerization right on the web is highly preferred because the free-standing adhesive film or adhesive coated article is obtained in one step. Due to the high volatility and flammability of some monomers, the selection of monomers for polymerization on web is more limited. For example, monomers like methylacrylate or ethylacrylate are too flammable and odorous to be handled safely, and non-flammable monomers like isobornyl acrylate will have to be substituted as a higher Tg yielding monomer. The examples below demonstrate the use of UV initiated dual liner curing of adhesives useful for PVC application.

Example 16

A mixture of 30 g isobornyl acrylate, 30 g N,N-dimethyl acrylamide, 40 g isooctyl acrylate and 0.3 g Esacure™ KB-1 was purged with nitrogen and exposed to low intensity UV light (UV "blacklight" from Sylvania) to make a coatable syrup. Once coatable viscosity was obtained, the reaction was stopped by turning off the UV light and exposure of the syrup to oxygen. The syrup was then completely polymerized as outlined under dual liner curing discussed above.

Example 17

This sample was made similar to example 16 above, but 20 g isobornyl acrylate, 30 g N,N-dimethyl acrylamide and 50 g isooctyl acrylate was used.

At room temperature, both UV cured samples can easily be positioned on a Panaflex™ substrate. Heat-lamination at 80° C. gives a good bond to the PVC without entrapment of gas bubbles. The adhesive does not discolor and is optically clear.

As expected, higher levels of isobornyl acrylate will increase the heat-activation temperature but they will also lead to embrittlement of the adhesive.

Comparative Example 17.2 grams ("g") butadiene/acrylonitrile synthetic rubber (Nippon Zeon Co., Nipol N009) and 0.5 g zinc oxide (New Jersey Zinc Co. Inc., Protox 166) were vulcanized by a rubber mill. 60.4 g of MEK (methylethyl ketone) and 10.4 g phenolic resin (Reichhold Inc., Varcum 861) was added to the pelletized synthetic rubber and then the mixture was stirred completely.

The solution was coated on polyethylene laminated release liner and was dried in an oven at about 25° C. for 5 min, 65° C. for 5 min, and 93° C. for 3 min to yield a heat-activatable adhesive having a coating weight of 90.4 g/m$^2$. The findings are shown in Table 3.

The adhesive was laminated to Msol primed prismatic retroreflective sheeting at 75° C. by using a heat laminator. The properties are shown in Table 4.

Comparative Example 0.23 g of 5 weight percent bisamide crosslinker in toluene and 15 g of methyl ethyl ketone were added to 100 g of a 93:7 isooctylacrylate:acrylic acid copolymer, and the solution was mixed completely.

The solution was coated on a siliconized paper liner and was dried at room temperature (about 75° C.) for 5 min, 65° C. for 4 min, and 95° C. for 3 minutes. As a result, a pressure sensitive adhesive (133.9 g/m$^2$) was obtained and the findings are shown in Table 3.

The adhesive was laminated to a primed prismatic retroreflective sheeting at room temperature by a laminator. The properties are shown in Table 4.

Comparative Example

The same procedure as Example 1 was done except the use of 90 weight percent of isooctyl acrylate and 10 weight percent of acrylic acid and the addition of 0.18 parts by weight of triazine (XL-353) crosslinker. The findings are shown in Table 3 and 4.

TABLE 1

Heat-activatable Adhesives of Examples 1–11

|  | Elastic Modulus at 30° C. (dyn/cm$^2$) | Elastic Modulus at 70° C. (dyn/cm$^2$) | Transparency (%) | Glass Transition Temp. (°C.) | Pre-adhesion (gf/in) | Post-adhesion (kgf/in) |
|---|---|---|---|---|---|---|
| Example 1 | 2.5 × 10$^7$ | 3.5 × 10$^6$ | 89.4 | 24 | 160 | 5.5 |
| Example 2 | 2.3 × 10$^7$ | 3.4 × 10$^6$ | 89.6 | 24 | 140 | 2.2 |
| Example 3 | 2.3 × 10$^7$ | 3.5 × 10$^6$ | 89.5 | 23 | 140 | 2.2 |
| Example 4 | 2.6 × 10$^7$ | 3.5 × 10$^6$ | 90.1 | 27 | 260 | 1.7 |
| Example 5 | 3.3 × 10$^7$ | 3.6 × 10$^6$ | 89.8 | 26 | 250 | 1.5 |
| Example 6 | 3.6 × 10$^7$ | 4.0 × 10$^6$ | 89.9 | 26 | 230 | 1.5 |
| Example 7 | 3.0 × 10$^7$ | 4.2 × 10$^6$ | 90.3 | 20 | 190 | 3.5 |
| Example 8 | 1.0 × 10$^7$ | 2.0 × 10$^6$ | 89.7 | 16 | 820 | 8.3 |
| Example 9 | 1.1 × 10$^7$ | 3.6 × 10$^6$ | 89.4 | 15 | 780 | 6.5 |
| Example 10 | 1.3 × 10$^7$ | 6.0 × 10$^6$ | 89.4 | 13 | 730 | 5.9 |
| Example 11 | 1.4 × 10$^7$ | 4.1 × 10$^6$ | 90.4 | 14 | 250 | 7.4 |

TABLE 2

Heat Applicable Prismatic Retroreflective Sheetings Examples 1–11

|  | Whiteness Cap Y (%) | Provisional Bonding Test | HLVA Temp (°C.)* | Retro-reflectivity Loss after HLVA Application (%) | Bonding Test | Round Edge Test (mm) |
|---|---|---|---|---|---|---|
| Example 1 | 46.5 | Excel | 70 | 2 | Excel | 5 |
| Example 2 | 47.2 | Excel | 70 | 5 | Excel | 5 |
| Example 3 | 46.3 | Excel | 70 | 1 | Excel | 5 |
| Example 4 | 45.9 | Excel | 70 | 3 | Excel | 5 |
| Example 5 | 46.3 | Excel | 70 | 3 | Excel | 5 |
| Example 6 | 46.5 | Excel | 70 | 2 | Excel | 5 |
| Example 7 | 47.2 | Excel | 70 | 2 | Excel | 6 |
| Example 8 | 46.1 | Excel | 70 | 1 | Excel | 5 |
| Example 9 | 45.5 | Excel | 70 | 4 | Excel | 6 |
| Example 10 | 46.7 | Excel | 70 | 2 | Excel | 7 |
| Example 11 | 46.3 | Excel | 70 | 2 | Excel | 7 |

*Bake time was 1.5 min at 70° C.

TABLE 3

Comparative Examples 1–3

|  | Elastic Modulus at 30° C. (dyn/cm$^2$) | Elastic Modulus at 30° C. (dyn/cm$^2$) | Transparency (%) | Glass Transition Temp. (°C.) | Pre-adhesion (gf/in) | Post-adhesion (kgf/in) |
|---|---|---|---|---|---|---|
| Comp. 1 | $2.0 \times 10^8$ | $2.0 \times 10^7$ | 40.5 | 42 | 0 | 1.8 |
| Comp. 2 | $2.5 \times 10^6$ | $1.4 \times 10^6$ | 92.1 | −13 | 2030 | 3.5 |
| Comp. 3 | $3.3 \times 10^6$ | $2.0 \times 10^6$ | 89.7 | −7 | 1750 | 4.9 |

TABLE 4

Comparative Examples 1–3

|  | Whiteness Cap Y (%) | Provisional Bonding Test | HLVA Temp (°C.)* | Retro-reflectivity Loss after HLVA Application (%) | Bonding Test | Round Edge Test (mm) |
|---|---|---|---|---|---|---|
| Comp. 1 | 39.3 | Slide | 93 | 30 | Delam | >10 |
| Comp. 2 | 46.1 | Tack | RT | 0 | Excel | >10 |
| Comp. 3 | 46.5 | Tack | RT | 0 | Excel | >10 |

Various modifications and alterations of this invention will become apparent to those skilled in the art without departing from the scope and spirit of this invention.

What is claimed is:

1. A heat-activatable adhesive composition comprising an acrylic copolymer, said copolymer comprising:
   (a) about 10 to 85 wt-% based on monomer weight of a monomer consisting of an acrylate or methacrylate ester of a non-tertiary alkyl alcohol whose homopolymer has a $T_g$ of about 0° C. or lower;
   (b) about 10 to 70 wt-% based on monomer weight of a monomer consisting of an acrylate or methacrylate ester of an alcohol whose homopolymer has a $T_g$ of at least about 50° C.; and
   (c) about 5 to 50wt-% based on monomer weight of a monomer containing a polar functional group;
   wherein said heat-activatable adhesive develops a provisional bond under pressure until heat is applied.

2. The adhesive composition of claim 1 which exhibits transparency of at least 85 percent.

3. The adhesive composition of claim 1 wherein the monomer (a) comprises an acrylate or methacrylate ester of a non-tertiary alkyl alcohol wherein the alkyl moiety contains 4 to 12 carbon atoms.

4. The adhesive composition of claim 1 wherein the monomer (b) comprises an acrylate or methacrylate ester of a bridged cycloalkyl alcohol having at least 6 carbon atoms or an aromatic alcohol.

5. The adhesive composition of claim 1 wherein the monomer (a) is selected from the group consisting of n-butyl acrylate, isobutyl acrylate, n-hexyl acrylate, 2-methyl butyl acrylate, 2-ethylhexyl acrylate, 2-ethylhexyl methacrylate, n-octyl acrylate, n-octyl methacrylate, isooctyl acrylate, isooctyl methacrylate, isononyl acrylate, isodecyl acrylate, and mixtures thereof.

6. The adhesive composition of claim 1 wherein the monomer (a) is selected from the group consisting of n-butyl acrylate, 2-methyl butyl acrylate, 2-ethylhexyl acrylate, isooctyl acrylate, and mixtures thereof.

7. The adhesive composition of claim 1 wherein the monomer of part (c) contains a polar functional group selected from the group consisting of carboxylic acid, sulfonic acid, phosphoric acid, hydroxy, lactam, lactone, N-substituted amide, N-substituted amine, and carbamate.

8. The adhesive composition of claim 1 wherein the monomer of part (c) is selected from the group consisting of acrylic acid, β-carboxyethyl acrylate, methacrylic acid, crotonic acid, fumaric acid, N,N-dimethyl acrylamide, N,N-dimethyl methacrylamide, N,N-diethyl acrylamide, N,N-diethyl methacrylamide, N-vinyl caprolactam, and N-vinyl pyrrolidone.

9. The adhesive composition of claim 1 wherein the monomer (b) is selected from the group consisting of 3,5-dimethyl adamantyl acrylate; 3,5-adamantyl methacrylate; isobornyl acrylate, isobornyl methacrylate; 4-biphenylyl acrylate; 4-biphenylyl methacrylate; 2-naphthyl acrylate; 2-naphthyl methacrylate; and mixtures thereof.

10. The adhesive composition of claim 1 wherein the $T_g$ of the composition is about 0 to 40° C.

11. The adhesive composition of claim 1 wherein the composition has an elastic modulus, measured by dynamic mechanical thermal analyzer, 6.28 rad/sec, compression mode ranging from about $5 \times 10^6$ to about $1.0 \times 10^8$ dyn/cm$^2$ at 30° C.

12. The adhesive composition of claim 1 wherein the composition has an elastic modulus, measured by dynamic mechanical thermal analyzer, 6.28 rad/sec, compression mode ranging from about $5 \times 10^5$ to about $1 \times 10^7$ dyn/cm$^2$ at 70° C.

13. The adhesive composition of claim 1 wherein the transparency of the composition is at least 89 percent.

14. The adhesive composition of claim 1 wherein the acrylic polymer is crosslinked via a crosslinking agent selected from the group consisting of triazine compounds, acrylated urethanes, hydrogen abstraction crosslinking compounds, and acrylated polyols.

15. A heat-activatable adhesive composition comprising:
(a) about 10 to 40 wt-% based on monomer weight of a monomer consisting of an acrylate or methacrylate ester of a non-tertiary alkyl alcohol whose homopolymer has a $T_g$ of about 0° C. or lower;
(b) about 25 to 60 wt-% based on monomer weight of a monomer consisting of an acrylate or methacrylate ester of an alcohol whose homopolymer has a $T_g$ of at least about 50° C.;
(c) about 10 to 40 wt-% based on monomer weight of a monomer having a polar functional group;
(d) about 0.05 to 20 wt.-% of a crosslinking agent; and
(e) about 0.05 to 0.3 wt-% of an initiator.

* * * * *